Ca# UNITED STATES PATENT OFFICE.

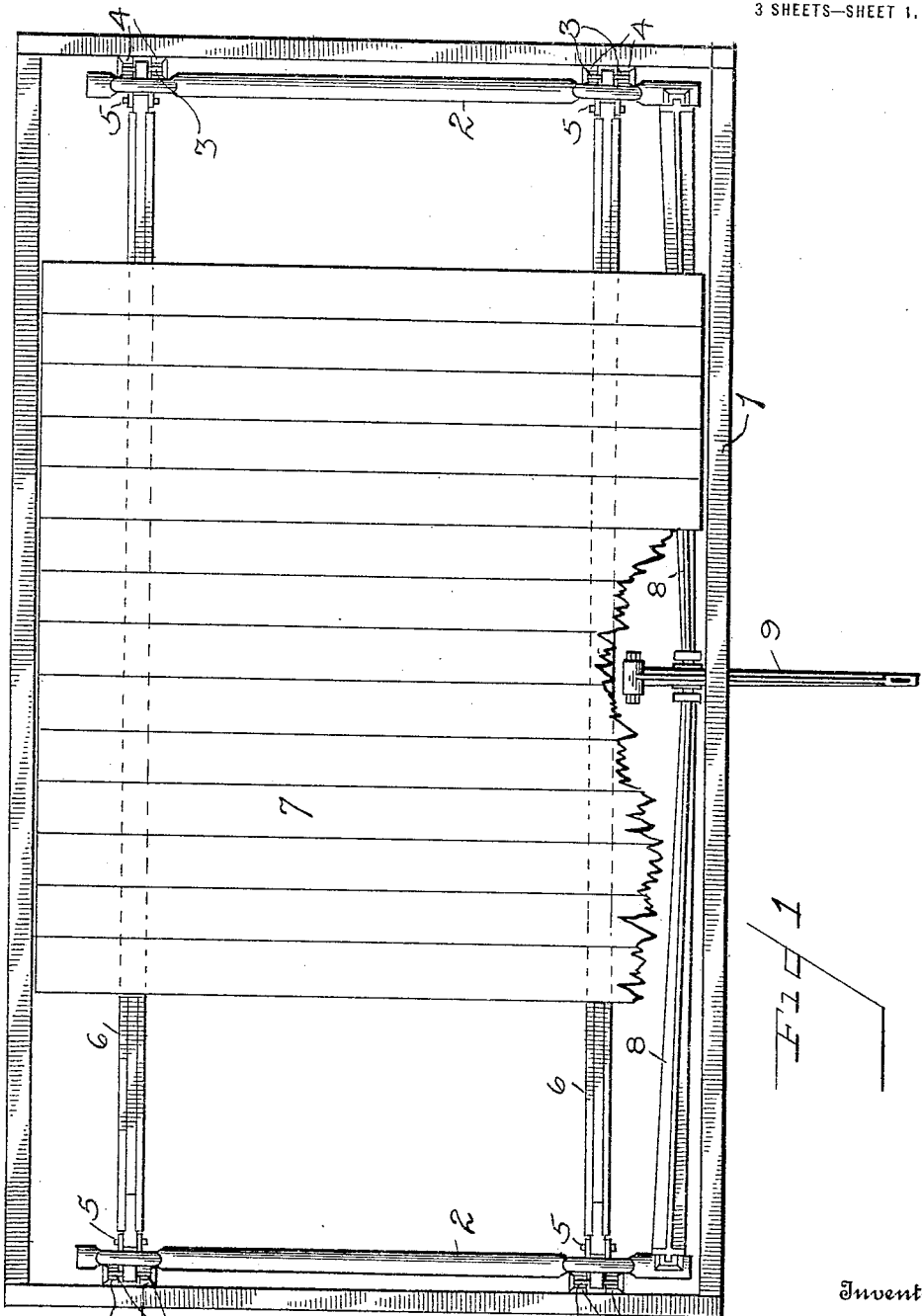

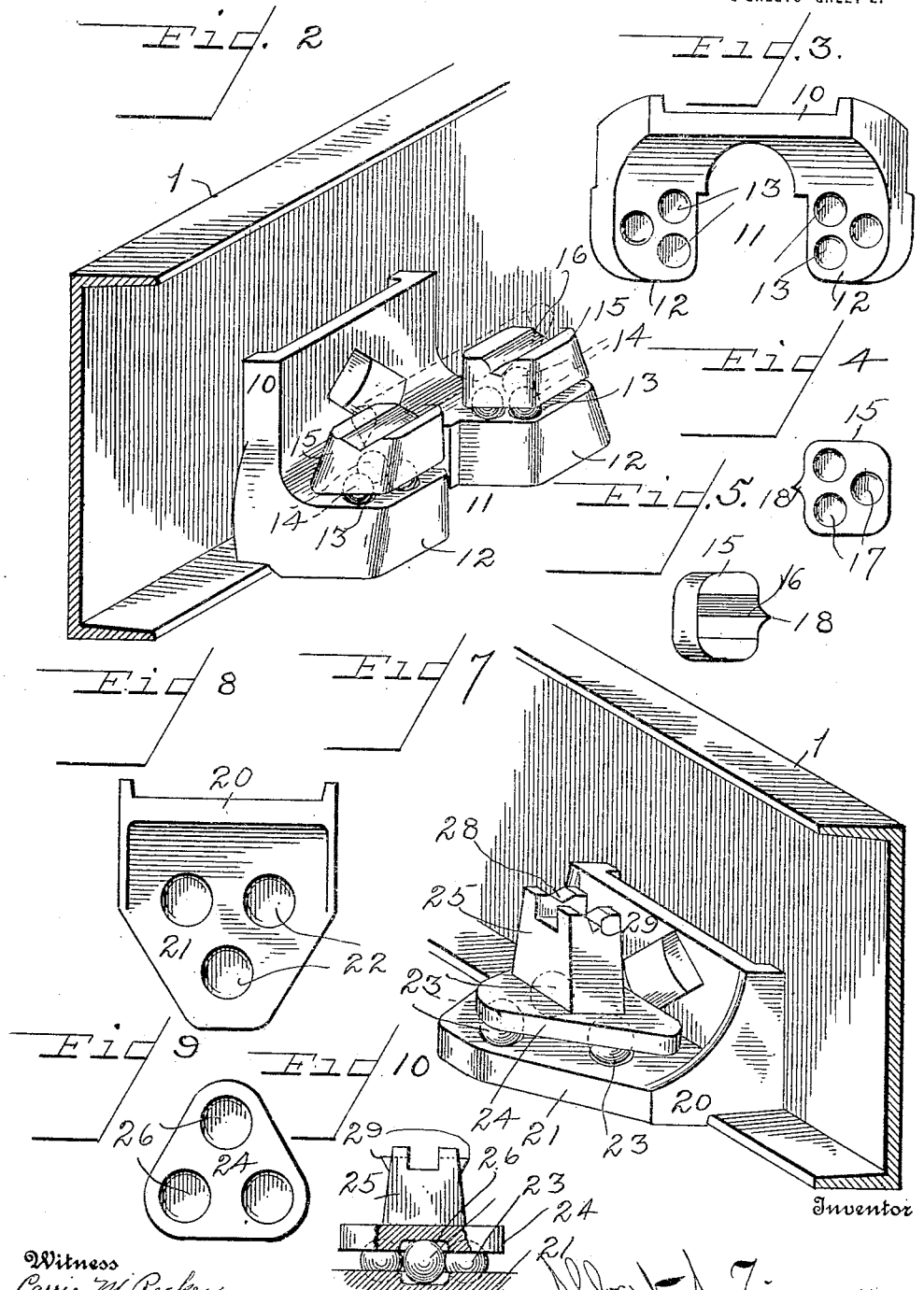

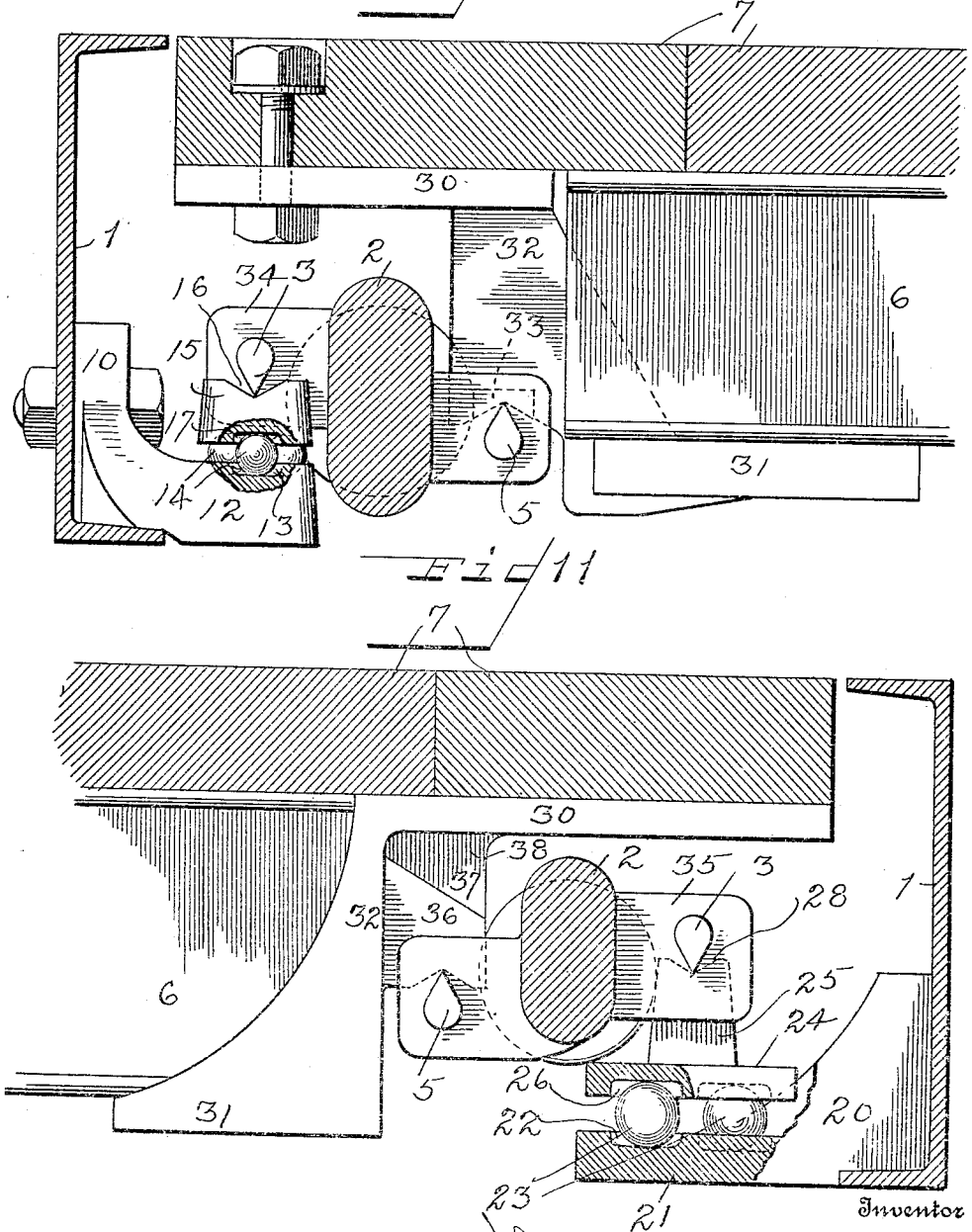

ALBERT J. ZIMMERMAN, OF DAYTON, OHIO, ASSIGNOR, BY MESNE ASSIGNMENTS, TO THE RICHMOND-STANDARD MANUFACTURING COMPANY, OF RICHMOND, INDIANA, A CORPORATION OF INDIANA.

WEIGHING-SCALE.

1,271,497.  Specification of Letters Patent.  Patented July 2, 1918.

Application filed July 25, 1916. Serial No. 111,301.

*To all whom it may concern:*

Be it known that I, ALBERT J. ZIMMERMAN, citizen of the United States, residing at Dayton, in the county of Montgomery and State of Ohio, have invented certain new and useful Improvements in Weighing-Scales, of which the following is a specification.

My invention relates to weighing scales and more particularly to scales of large capacity such as wagon or car scales but is also applicable to scales of less capacity.

The object of the invention is to simplify the structure as well as the means and mode of operation of such devices whereby they will not only be cheapened in construction, but will be more efficient in use, sensitive, accurate in operation, durable, self-adjusting and unlikely to get out of repair.

A further object of the invention is to provide an improved form of vibratory fulcrum support for the platform levers which will automatically compensate for the horizontal vibration of the platform incident to the weighing of live stock or the travel of a wagon, car, truck or other vehicle on and off of the platform.

As ordinarily constructed the longitudinal and lateral oscillation or vibration of the platform is compensated for by the relative movement of the platform bearings upon the knife edge bearings of the round lever or the vibration of the fulcrum bearings of the round lever upon the fulcrum support. This vibration causes the knife edge bearings to climb or slide upon the inclined sides of the fulcrum bearings or the platform bearings, causing the bearings to grind and wear one upon the other thereby seriously affecting the sensitiveness and accuracy of the scale and materially shortening its period of usefulness.

A further object of the invention is to provide an improved form of self-adjusting supporting bearing to automatically compensate for any inaccuracy of manufacture or assembly and which will adjust itself to the alinement of the scale levers in the event that the lever is moved out of its normal or alined position accidentally or otherwise. This automatic compensating or self-adjusting feature serves to maintain the bearing edge of the knife edge bearings in the bottom or apex of the grooved depression of the corresponding bearing faces under all conditions of use. It prevents any skew adjustment of the lever in relation with the bearing support which might otherwise cause the bearings to bind, due to the unalinement of the knife edge bearing with the V shaped groove of the support or otherwise tend to retard the free movement of the lever.

This difficulty has heretofore been sought to be overcome by suspending the round or transverse levers upon swinging supports or clevises. Such swinging supports, however, permit the oscillation of the platform in one direction only, while they tend to resist the vibration in a transverse direction. Furthermore, such oscillatory fulcrum supports, by their swinging or arcuate movement, effect a grinding or wearing action upon the knife edge bearing which is overcome by the present construction in which the bearing support vibrates or oscillates in a substantially horizontal plane. In other words, in the present construction the platform, the round or transverse lever, and the fulcrum support constantly maintain their relation throughout the vibratory or oscillatory movement. These parts move in unison without relative change of position in relation one with the other. By this construction the wear upon the bearings is reduced to minimum.

In the prior constructions in which the fulcrum support is suspended from the main frame, the point of suspension is usually a hook located adjacent to the top edge of the end bar of the frame. Such hook supports the entire load which may be placed upon the platform and tends to warp or buckle the frame by drawing the top edge thereof inward when subjected to heavy load or draft. This buckling or warping of the main frame not only tends to cause deterioration of the scale but also by the variation of alinement of the levers the accuracy and sensitiveness of the scale is affected. In the present construction one of the primary objects is to support the scale platform from below and as low in relation with the main frame as is feasible.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figure 1 is a plan view of the assembled scale to which the present invention has been applied, a portion of the platform being removed to disclose the location and relation of the platform levers and their bearing. Fig. 2 is a perspective view of one of the fulcrum chairs or brackets for the round or transverse lever. Fig. 3 is a top plan view of the bracket or chair. Fig. 4 is a bottom plan view of one of the fulcrum blocks. Fig. 5 is a top plan view of one of the bearings or fulcrum blocks. Fig. 6 is a side elevation showing the relation of the support or chair and the round or transverse lever and the platform beam when in assembled relation. Fig. 7 is a perspective view of a modification of the fulcrum bearing or support. Fig. 8 is a top plan view of the bracket or chair employed in the construction shown in Fig. 7. Fig. 9 is a bottom plan view and Fig. 10 a front elevation, partly in section, of the bearing or fulcrum block employed in the construction shown in Figs. 7, 8, and 11. Fig. 11 is a side elevation illustrating the assembled relation of the floating fulcrum support, the round or transverse lever, and the platform beam of the construction shown in Figs. 7 to 10.

Like parts are indicated by similar characters of reference throughout the several views.

The present invention relates particularly to the supporting connections or fulcrum supports of the platform levers and more particularly to a floating or vibratory support therefor which will compensate for horizontal vibration of the platform. As usually constructed the longitudinal and lateral oscillation or vibration of the scale platform not only causes the knife edge bearings of the platform lever to wear and become dull, rendering the scale less sensitive, but in time it destroys the accuracy of its operation and shortens the term of usefulness of the scale. To overcome this difficulty by providing floating or flexible yielding fulcrum supports whereby the fulcrum, the platform lever and platform may vibrate or oscillate as a single unit without relative independent movement of the members, automatically compensating for any vibration and causing the automatic alinement or adjustment of the fulcrum supports and the lever bearings in relation one with the other is one of the primary objects of the present invention.

In the drawings, 1 is the scale frame which may be of metal, preferably channel irons, or of wood or concrete as desired. Located at each end of the frame 1 are round or transverse levers 2—2 fulcrumed upon knife edge bearings 3 engaging vibratory fulcrum supports 4 which form the subject matter hereof, and will be hereinafter described. At their inner sides the round or transverse levers 2 carry knife edge bearings 5 upon which are supported the platform or floor beams 6 on which is located the usual floor of planks 7. Rigidly secured to the round or transverse levers 2 and extending inwardly therefrom are the long levers 8 which, at their inner or adjacent ends are connected with the cross or fifth lever 9.

The construction thus far described, except so far as it pertains to the floating or vibratory fulcrum bearing 4 is that generally employed in scales of this type. Through the yielding action of the vibratory fulcrum supports 4 for the round or transverse levers 2 the platform, together with the round or transverse levers 2 and the floating fulcrum blocks on which the round levers are carried are capable of both longitudinal and lateral vibration in unison in addition to the vertical movement of the platform and levers in relation with the fulcrum blocks by which the weight of the load or draft is determined.

It will be noted that the round or transverse levers 2 are contracted or flattened adjacent to the bearings 3 and 5. This is for the purpose of shortening the distance between the bearing edges of the knife edge bearings 3 and 5, thereby shortening the leverage of this arm or operating distance in comparison with the long arm 8. By shortening the distance between the bearings 3 and 5 in proportion with the leverage of the long arm 8, the pull or down-draft of the scale beam upon the cross or fifth lever 9 and thence through the fifth lever and its connections with the scale beam is materially lessened, thereby enabling the weighing of greater loads with less strain upon the levers and bearings. Furthermore, by so proportioning the leverage the round and long levers, together with the fifth lever may be made of less size, thereby resulting in a saving of material and of weight, still reducing the shipping cost.

In the construction shown in Figs. 2 to 5, inclusive, the floating or self-adjusting fulcrum support comprises a bracket or chair 10 bolted or otherwise secured to the end bar of the main frame 1 and bifurcated as at 11. In the upper faces of the arms 12 of said bifurcated bracket 10 there are formed a plurality of shallow depressions 13 having comparatively flat bottoms. Located in each of the depressions or sockets 13 is a bearing ball 14. In the event that the bottoms of the cavities or recesses 13 are formed concave such cavity is formed upon a radius of greater extent than the radius of the ball. However, the preferable construction is to form the bottoms of the depressions or sockets 13 substantially flat with slightly rounded or filleted angles at their peripheries.

The construction in either event is such that the bearing balls 14 are capable of a limited rolling or vibratory movement in any direction which, however, will be limited by the engagement of the ball with the periphery of the depression or socket. While any number of bearing balls 13 may be employed, three balls, as shown in the drawing, are the preferable number. This affords a three point bearing which will be self adjusting to the end that the fulcrum blocks will rest evenly upon each of the balls.

Resting upon the balls 14 are floating fulcrum or bearing blocks 15 having in their upper faces V shaped or grooved depressions 16 for the engagement of the knife edge bearings 3 of the round or transverse levers 2. On their under side the floating fulcrum or bearing blocks 15 are provided with depressions or sockets 17 substantially corresponding in size, form and relative position with those of the bracket or support 10. The bearing balls 14 engage the corresponding sockets or depressions of the bracket arms and the floating fulcrum or bearing block 15.

In the construction shown in these figures 2 to 5, there is a separate fulcrum or bearing block for each arm 12 of the bracket 10. These bearing or fulcrum blocks are capable of independent vibration and oscillation upon the bearing balls 14. They are not only capable of longitudinal and lateral vibration but also of a rotary or oscillatory movement in a horizontal plane. The construction is such that the bearing or fulcrum blocks 15 are free to move or vibrate in any horizontal direction whereby they will automatically adjust themselves to cause the bottom or apex of the V shaped groove 16 to coincide with the knife edge bearing 3 of the transverse or round lever. Likewise the fulcrum or bearing blocks 15 will oscillate or roll in any direction to compensate for vibration of the platform and its levers. The relation of the bearing balls and the sockets or depressions by which this floating or vibratory action is effected is shown in detail in Fig. 9.

The floating fulcrum or bearing blocks 15 are provided on their inner or adjacent sides with friction points 18 which serve to limit the lateral movement of the round or transverse lever in relation with the fulcrum block by engaging the lug thereof by which the knife edge bearing 3 is carried. These friction points 18 provide limited lateral or thrust bearings which serve to space the main body of the fulcrum or bearing block away from the round lever lug, thereby reducing to minimum the friction which might otherwise result.

While the construction shown in Figs. 2 to 5 provides for two independent floating fulcrum or bearing blocks 15 for each bracket or chair and the incidental use of six bearing balls adjacent to each corner of the main frame, the construction shown in Figs. 7 to 11, inclusive, involves the use of but a single floating fulcrum or bearing block and the use of but three bearing balls at each corner of the main frame.

In the last mentioned construction there is employed a bracket or chair 20 bolted to the end bar of the main frame upon the laterally projecting shelf 21 on which are formed a plurality of depressions or sockets 22 having either substantially flat bottoms or bottoms slightly concave upon a radius greater than that of the bearing balls to be employed. The preferable construction is shown in Fig. 10. Located in these depressions or sockets 22 are bearing balls 23 upon which rests a floating or vibratory fulcrum or bearing block comprising a base 24 and a standard 25. The under side of the base 24 is provided with a plurality of depressions or sockets 26 substantially equal in size, shape and relative location to the sockets or depressions 22 in the shelf 21 of the bracket 20. The bearing balls 23 engage simultaneously in the sockets or depressions of the chair or bracket and those of the floating fulcrum block.

The floating or vibratory fulcrum support is provided with oppositely disposed friction points 29 similar to and for the same purpose as the friction points 18 heretofore described.

In assembling the apparatus the floating or vibratory fulcrum or bearing blocks are rested upon the bearing balls as before described and as shown in Figs. 2, 6, 7, and 11 and the knife edge fulcrum bearings 3 of the round or transverse lever 2 rest in the V shaped depressions or grooves 17 of the blocks 15 or the notches 28 of the standards 25. The platform beams 6 are then supported upon the upturned knife edge bearings 5 at the opposite side of the round or transverse levers.

The beams 6 are provided with heads comprising oppositely disposed shelves or ledges 30 and 31 spaced one above the other and connected by an upright web 32, as shown in Fig. 6. The web portion 32 is provided with an offset or shoulder in which is inserted a bearing block 33 having in its under side a V shaped or grooved depression in which the knife edge bearing 5 engages.

In Fig. 11 a cast or chilled bearing lug 36 is shown in lieu of the inserted steel bearing 33 shown in Fig. 6. The body of the cast lug 36 is cut away at 37 below the top plate or ledge 30 leaving only a connecting web 38. The purpose of this form is to cause the lug 36 to cool or chill more quickly, thereby causing it to become very hard in order to resist wear. Furthermore, there is less possibility of flaws or blow holes being formed in the smaller mass of metal thereby insuring greater strength. The round or transverse lever is normally supported in balanced position 6 by the connection of the long lever 8 with the cross or fifth lever 9. The vertical swinging movement of the round or cross lever 2 about the bearing of the knife edge bearings 3 upon the fulcrum or bearing block 15 under the influence of the platform beam 6 and the load placed thereon is transmitted through the long lever 8 and cross or fifth lever 9 to the weighing beam by which is determined the weight of the load or draft. In the construction shown in Figs. 2 to 6, the round or cross lever is provided with a single outward projecting lug 34 from which the knife edge fulcrum bearings 3 project in opposite directions into engagement with the separate or independent fulcrum or bearing blocks 15. In the construction shown in Figs. 7 to 11 the round or transverse lever is provided with parallel spaced lugs or arms 35 between which the knife edge fulcrum bearings 3 extend. In this construction the parallel spaced lugs extend on opposite sides of the standard 25. By the construction shown in Figs. 7 to 11 bearing balls of larger diameter may be employed and the balls be more widely spaced one from another.

While as thus far described the floating or vibratory bearing has been described only in connection with the fulcrum bearing of the round or transverse lever 2, it is to be understood that it is not limited to this particular location but that a construction similar to those disclosed in Figs. 2 and 7 may be employed as a fulcrum support for the fifth or cross lever 9. Inasmuch as the construction and arrangement of parts would be identical, it is thought that a specific illustration of the application of this invention to the fifth lever is unnecessary.

It has been found in practice that either of the constructions heretofore described or variations thereof such as will readily occur to any mechanic skilled in the art of scale mechanism, affords a very efficient, sensitive, and durable construction.

From the above description it will be apparent that there is thus provided a device of the character described possessing the particular features of advantage before enumerated as desirable but which obviously is susceptible of modification in its form, proportion, detail construction, or arrangement of parts without departing from the principle involved or sacrificing any of its advantages.

While in order to comply with the statute the invention has been described in language more or less specific as to certain structural features, it is to be understood that the means and construction herein described comprise but one mode of putting the invention into effect and the invention is therefore claimed broadly in any of its possible forms or modifications within the scope of the appended claims.

Having thus described my invention, I claim:

1. In a weighing scale, the combination with a main frame, a platform, and platform levers of fixed lever supports projecting beneath the levers and floating fulcrums for the platform lever carried thereby, said floating fulcrums being capable of vibratory movement in any direction in a horizontal plane.

2. In a weighing scale, the combination with a main frame, a platform, platform levers of fixed lever supports, independent fulcrum blocks for said levers carried thereby and bearing balls interposed between the fulcrum blocks and the supports whereby said fulcrum blocks will be capable of vibratory movement in different angularly related directions in a substantially horizontal plane.

3. In a weighing scale, the combination with a main frame, a platform, and platform levers of fixed lever supports, said supports having a plurality of depressions arranged in triangular relation in their upper faces, floating fulcrum blocks for said levers having correspondingly located depressions in their bottom faces, and bearing balls engaging simultaneously in the depressions of the supports and the fulcrum blocks, whereby said blocks will be capable of vibratory movement in a horizontal plane.

4. In a weighing scale, a stationary main frame, a vibratory platform, platform levers, and fulcrum blocks therefor capable of vibratory movement both laterally and longitudinally in a substantially horizontal plane in unison one with the other, and bearing balls upon which the fulcrum blocks are supported and vibrate.

5. In a weighing scale, the combination with a stationary main frame, a platform, and platform levers, of fixed supports for the platform levers carried by the main frame, and vibratory fulcrum blocks for the platform levers having triangular disposed bearings upon said fixed supports.

6. In a weighing scale, a stationary support for a scale lever, a floating fulcrum block upon which the scale lever is fulcrumed and a plurality of bearing balls arranged in offset relation interposed between the support and block upon which the floating fulcrum block rests whereby said floating fulcrum block is capable of vibratory movement in any horizontal direction.

7. In a weighing scale, a stationary main frame, a movable platform lever, a supporting bracket fixedly secured to the main frame projecting beneath the said platform lever, and independent fulcrum block supported upon said bracket upon which said platform lever is fulcrumed, said block being capable of vibratory movement in any horizontal direction.

8. In a weighing scale, a bifurcated supporting bracket, independent floating fulcrum blocks carried by each arm of said bifurcated bracket and bearing balls interposed between the supporting arms of the bracket and the fulcrum blocks, said blocks being capable of independent vibratory movement in any horizontal direction.

9. In a weighing scale, a fixed support, and independent floating fulcrum bearing blocks carried by said support and bearing balls interposed between the support and fulcrum blocks whereby said blocks will be capable of independent vibratory movement in any horizontal direction.

10. In a weighing scale, independent floating fulcrum blocks arranged in pairs, one pair for each fulcrum bearing of the scale, fixed supports for said fulcrum blocks and bearing balls interposed between the blocks and supports whereby said blocks will be capable of independent vibratory movement in any horizontal direction.

In testimony whereof, I have hereunto set my hand this 10th day of July, A. D. 1916.

ALBERT J. ZIMMERMAN.

Witnesses:
B. H. RANNELLS,
THOMAS B. HERRMAN.

Copies of this patent may be obtained for five cents each, by addressing the "Commissioner of Patents, Washington, D. C."